Patented Sept. 12, 1939

2,172,607

UNITED STATES PATENT OFFICE 2,172,607

BENZYL-OXYALKYL AND HYDROXYALKYL ETHERS OF CINCHONA ALKALOIDS AND METHOD OF PREPARATION

Courtland L. Butler, Alice G. Renfrew, and Leonard H. Cretcher, Pittsburgh, Pa., assignors to Mellon Institute of Industrial Research, a corporation of Pennsylvania No Drawing. Application April 26, 1937, Serial No. 139,002

8 Claims. (Cl. 260—284)

This invention consists in new compositions of matter, benzyl-oxyalkyl and hydroxyalkyl ethers of phenolic hydroxyl-group-containing cinchona alkaloids, and in new processes for the hydroxy-alkylation of these alkaloids. The method for the preparation of benzyl-oxyalkyl cinchona derivatives consists in alkylation of phenolic hydroxyl-group-containing cinchona alkaloids with benzyl-oxyalkyl aromatic sulfonates according to the equation—

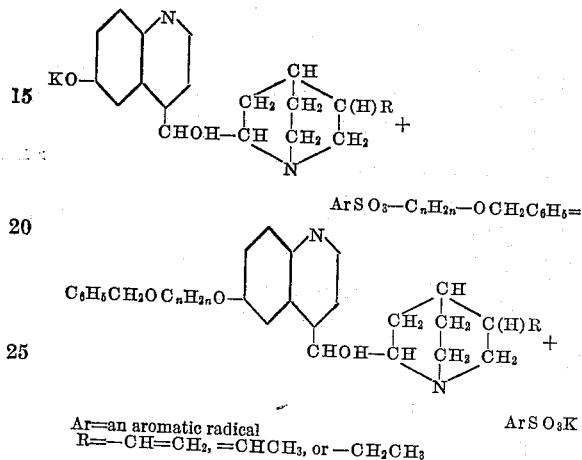

Ar=an aromatic radical
R=—CH=CH$_2$, =CHOH$_3$, or —CH$_2$CH$_3$

Hydroxyalkyl cinchona ethers are readily prepared from such benzyl-oxyalkyl derivatives by hydrolyzing them in dilute mineral acid according to the equation—

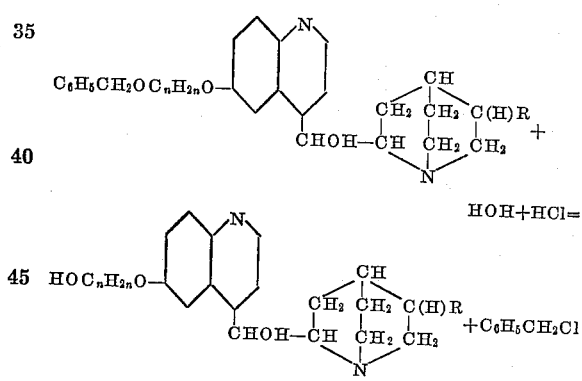

These cinchona derivatives have valuable medicinal properties, and in particular, find application as antipneumococcic drugs. We have reason to believe that they are very low in toxicity, that they are free of the damaging eye effect characteristic of some cinchona derivatives, and that they are highly active against the pneumococcus both in vitro and in vivo.

EXAMPLE 1.—*Alkylation of apocupreine with benzyl-oxyethyl benzene sulfonate*

30 parts of apocupreine are converted to potassium salt in alcoholic solution, and digested for two hours on a water bath with 26 parts of benzyl-oxyethyl benzene sulfonate. The reaction product, benzyl-oxyethyl apocupreine, is separated and worked up in the usual way. The substance may be conveniently recrystallized from acetone, if desired.

It will be understood that conversion to a potassium salt is exemplary; and that the conversion may be to any alkali salt, as a chemist knows.

EXAMPLE 2.—*Alkylation of apocupreine with benzyl-oxyethyl p-toluene sulfonate*

In a similar way 50 parts of apocupreine in the form of potassium salt are alkylated in alcoholic solution with 48 parts of benzyl-oxyethyl p-toluene sulfonate and the product, benzyl-oxyethyl apocupreine, is separated and worked up.

EXAMPLE 3.—*Preparation of benzyl-oxyethyl apocupreine from b-chloroethyl apocupreine*

B-chloroethyl apocupreine is prepared by alkylating the potassium salt of apocupreine with B-chloroethyl p-toluene sulfonate.

90 parts of B-chloroethyl apocupreine are digested in benzyl alcohol solution in which 6.5 parts of sodium has been dissolved. The reaction mixture is diluted with ether, and the solution is filtered from sodium chloride. The desired product, benzyl-oxyethyl apocupreine, is extracted from the ether solution with dilute sulfuric acid and worked up in the usual way.

EXAMPLE 4.—*Preparation of benzyl-oxyethyl hydrocupreine*

90 parts of hydrocupreine are converted to potassium salt in alcoholic solution and warmed for two hours with 88 parts of benzyl-oxyethyl p-toluene sulfonate. The desired product, benzyl-oxyethyl hydrocupreine, is separated and worked up.

EXAMPLE 5.—*Preparation of Γ-benzyl-oxypropyl apocupreine*

46 parts of apocupreine in the form of potassium salt are alkylated in alcoholic solution with 48 parts of Γ-benzyl-oxypropyl p-toluene sulfonate. The desired product, Γ-benzyl-oxypropyl apocupreine, is separated and worked up.

EXAMPLE 6.—*Preparation of 1-benzyloxy 2-propyl apocupreine α-methyl β-benzyloxyethyl apocupreine*

62 parts of apocupreine in the form of potassium salt are alkylated in alcoholic solution with 64 parts of 1-benzyloxy 2-propyl p-toluene sulfonate. The desired product, 1-benzyloxy 2-propyl apocupreine, is separated and worked up.

EXAMPLE 7.—*Preparation of hydroxyethyl apocupreine*

9 parts of benzyl-oxyethyl apocupreine are dissolved in 60 parts of dilute hydrochloric acid containing 16 parts of concentrated acid. On distillation the benzyl group is hydrolyzed off as benzyl chloride, which is carried over in the distillate. The last of the benzyl chloride is removed by steam distillation. Hydroxyethyl apocupreine remains in the acid solution in the reaction vessel. It is worked up in the usual way.

EXAMPLE 8.—*Preparation of hydroxyethyl hydrocupreine*

In a similar way benzyl-oxyethyl hydrocupreine is hydrolyzed in dilute hydrochloric acid to hydroxyethyl hydrocupreine and the product is separated and worked up.

EXAMPLE 9.—*Preparation of Γ-hydroxypropyl apocupreine*

Γ-benzyl-oxypropyl apocupreine is similarly hydrolyzed in dilute acid and the product, Γ-hydroxypropyl apocupreine, is separated and worked up.

EXAMPLE 10.—*Preparation of 1-hydroxy 2-propyl apocupreine (α-methyl β-hydroxyethyl apocupreine)*

1-benzyloxy 2-propyl apocupreine (α-methyl β-benzyloxyethyl apocupreine) is similarly hydrolyzed in dilute hydrochloric acid and the product, 1-hydroxy 2-propyl apocupreine, is separated and worked up.

We claim as our invention:

1. As a new composition of matter, a benzyloxyalkyl ether of a phenolic-hydroxyl-group-containing cinchona alkaloid.

2. The method herein described of preparing a benzyl-oxyalkyl ether of a cinchona alkaloid, which consists in alkylating a phenolic hydroxyl-group-containing cinchona alkaloid with a benzyl-oxyalkyl aromatic sulfonate.

3. As a new composition of matter, benzyl-oxyethyl apocupreine.

4. The method herein described of preparing benzyl-oxyethyl apocupreine which consists in alkylating apocupreine at the phenolic hydroxyl group with benzyl-oxyethyl aromatic sulfonate.

5. As a new composition of matter, Γ-benzyl-oxypropyl apocupreine, of the formula, $$C_6H_5CH_2OCH_2CH_2CH_2OC_{19}H_{21}ON_2$$

as specified.

6. The method herein described of preparing Γ-benzyl-oxypropyl apocupreine, which consists in alkylating apocupreine at the phenolic hydroxyl group with Γ-benzyl-oxypropyl p-toluene sulfonate, and separating the desired product.

7. As a new composition of matter, 1-benzyloxy 2-propyl apocupreine (α-methyl β benzyloxy-ethyl apocupreine) of the formula, $$C_6H_5CH_2OCH_2\underset{\underset{CH_3}{|}}{CH}-OC_{19}H_{21}ON_2$$

as specified.

8. The method herein described of preparing 1-benzyloxy 2-propyl apocupreine (α-methyl β-benzyloxyethyl apocupreine), which consists in alkylating apocupreine at the phenolic hydroxyl group with 1-benzyloxy 2-propyl p-toluene sulfonate (α-methyl β-benzyloxyethyl para-toluene sulfonate).

COURTLAND L. BUTLER.
ALICE G. RENFREW.
LEONARD H. CRETCHER.